United States Patent [19]

Yoshida

[11] Patent Number: 4,495,584
[45] Date of Patent: Jan. 22, 1985

[54] INTERMITTENT DRIVING SYSTEM FOR SYNCHRONIZING CONTROL OF CONVEYOR AND DISPENSING SYSTEMS

[75] Inventor: Toshio Yoshida, Yokohama, Japan

[73] Assignee: Toyo Shokuhin Kikai Kabushiki Kaisha, Yokohama, Japan

[21] Appl. No.: 360,391

[22] Filed: Mar. 22, 1982

[30] Foreign Application Priority Data

Mar. 30, 1981 [JP] Japan ................................ 56-047904

[51] Int. Cl.³ .................... G05B 15/02; G06F 15/46
[52] U.S. Cl. .................................. 364/479; 141/183; 222/63; 198/341; 318/616; 364/478; 364/174
[58] Field of Search ............... 364/468, 469, 478, 479, 364/166, 174; 318/600, 601, 603, 610, 616–618, 326; 198/339–341, 855, 858, 859; 221/9, 15; 222/52, 63, 504; 141/183, 156, 129, 192

[56] References Cited

U.S. PATENT DOCUMENTS

| | | | |
|---|---|---|---|
| 3,430,751 | 3/1969 | Bateson | 198/505 |
| 3,677,540 | 7/1972 | Weiss | 222/63 X |
| 3,887,110 | 6/1975 | Porter | 222/63 X |
| 3,889,169 | 6/1975 | Hirschman et al. | 318/618 X |
| 4,006,395 | 2/1977 | Reesen | 318/625 X |
| 4,313,476 | 2/1982 | Bennett et al. | 141/183 X |

Primary Examiner—Joseph F. Ruggiero
Attorney, Agent, or Firm—Donald D. Mon

[57] ABSTRACT

A system for controlling and synchronizing the operation of a conveyor system and an article supply system. An encoder monitors the operation of a standard reference or dispensing device along with a rate detecting device. This information is fed into a computer employing a microprocessor. The microprocessor provides an output to a drive system for a conveyor or the like to be synchronized with a supplying or dispensing system.

6 Claims, 21 Drawing Figures

INTERMITTENT DRIVING SYSTEM FOR SYNCHRONIZING CONTROL OF CONVEYOR AND DISPENSING SYSTEMS

FIELD OF THE INVENTION

This invention relates to an intermittent drive system employed in supplying articles, filling containers for canning or bottling, film wrapping devices and other kinds of manufacturing machines, such as conveyors, seamers, sealers, printing machines and punching machines.

Heretofore, an intermittent drive system had a mechanism of cams or links, such as index cams, geneva gears, non-circular gears, cranks and rachets. Accordingly, in the prior art, complicated and accurate manufacturing is required so that it becomes expensive and takes much time to construct these machines. Moreover an intermittent drive system in a conventional device has difficulty in adjusting to changes in timing, rate or period of a cycle.

BACKGROUND OF THE INVENTION

The primary object of this invention is to provide an economical intermittent drive system which can be easily and rapidly constructed.

A secondary object of the present invention is to provide an intermittent drive system which can be easily adjusted to changes in timing, rate or period of a cycle.

These objects can be sufficiently attained by employing a system in which a series of rate pulse signals control a load driving motor.

The above and other features of the invention will be fully understood from the following detailed description and the accompanying drawings, in which:

BRIEF DESCRIPTION OF THE DRAWINGS

FIG. 8b is a sectional view taken along line A—A of FIG. 8a;

FIG. 9b is a sectional view taken along the line B—B of FIG. 9a;

FIG. 11b is a cross-sectional view taken along line C—C of FIG. 11a;

FIG. 13b is a cross-sectional view taken along line D—D of FIG. 13a.

DETAILED DESCRIPTION OF THE INVENTION

Figure 1:
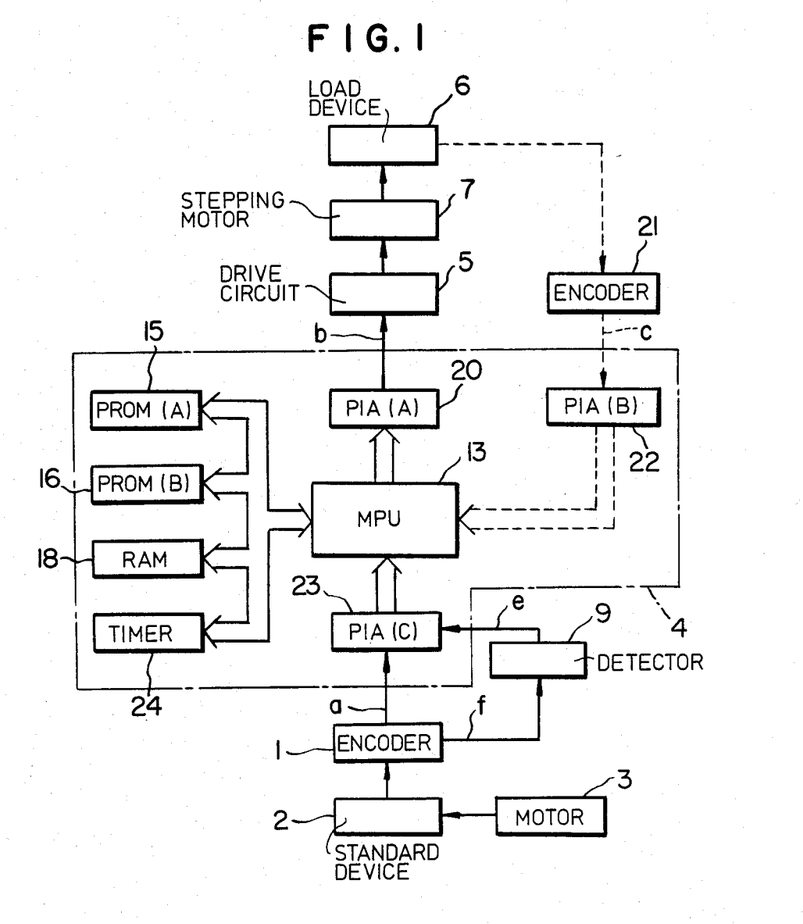
FIG. 1 is a schematic block diagram, generally illustrating one embodiment according to, the present invention.

FIG. 1 is a schematic block diagram generally illustrating the present invention in which 1 is an encoder, detecting the position of a standard device 2 such as dispensers for filling containers, supplying cups or caps, sheets and blanks, driven by a motor 3 which provides a reference standard for a driven load. Rate detector 9 detects the reference signals f, representing the rate of the standard device 2, which the reference standard for a driven load provided by encoder 1. A computer 4 generates a series of rate pulse signals at "b" in response to reference signals received at "a" from encoder 1 and received reference signals at "e" from the rate detecting device 9. Drive circuit 5 drives a load device 6 through a step motor 7 at the same rate and timing as that of the standard device 2, in response to received rate pulse signals from "b" synchronized with that of the standard device 2.

Figure 2:
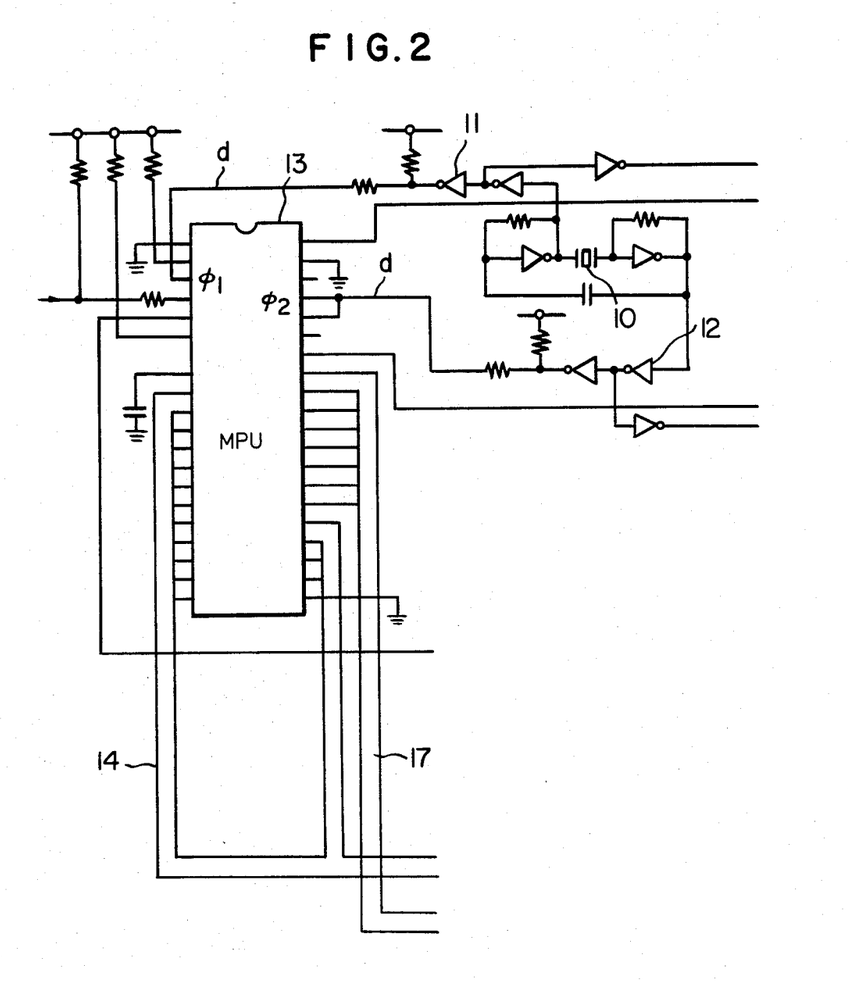
FIGS. 2, 3, 4 and 5 are electric computer circuits providing the intermittent drive system according to this invention.

In the computer 4, clock pulses of 1 MHertz are generated with a crystal oscillator 10 as shown in FIG. 2. The generated clock pulses are input on lines "d" to terminals $\phi_1$ and $\phi_2$ of MPU (microprocessor unit) 13 through wave shaping circuits 11 and 12. Address signals are generated successively from MPU 13 to an address bus 14; generated address signals are delivered to the inputs of P-ROM (A) 15, (Programmable Read Only Memory), P-ROM (B) 16, RAM (Random Access Memory) 18, timer 24, and interfaces PIA (A) 20, PIA (B) 22, PIA (C) 23, as shown in FIG. 1 and in greater detail in FIGS. 3, 4 and 5.

The function of the above mentioned devices are as follows: P-ROM (A) 15 stores main programs (Monitoring or programs to control the driving quantities or driving angles of a controlled device).

P-ROM (B) 16 stores data for varying the operation timer 24.

RAM 18 stores a part of the main program and is used as the register for MPU 13.

Timer 24 interrupts MPU 13 and indicates time.

Interfaces PIA(A) 20, PIA(B) 22 and PIA(C) 23 transduce input or output signals from adjacent connected devices.

Thus data signals corresponding to the address signals are read out from P-ROM(A) 15, P-ROM(B) 16 and RAM 18 and sent to MPU 13 through data bus 17. MPU 13 reads, computes and writes according to received data signals. The function and operation of these devices is not described in greater details as it is the same as in a conventional computer.

Thus MPU 13 controls the load 6 so it is driven in synchronization with the standard device 2. In this case, signals generated from MPU 13 through PIA(A) 20 are variable rate pulse signals output at "b". They are a series of rate pulse signals whose density varies within a period T of repeating cycles as shown in FIG. 7(b).

Figure 4:
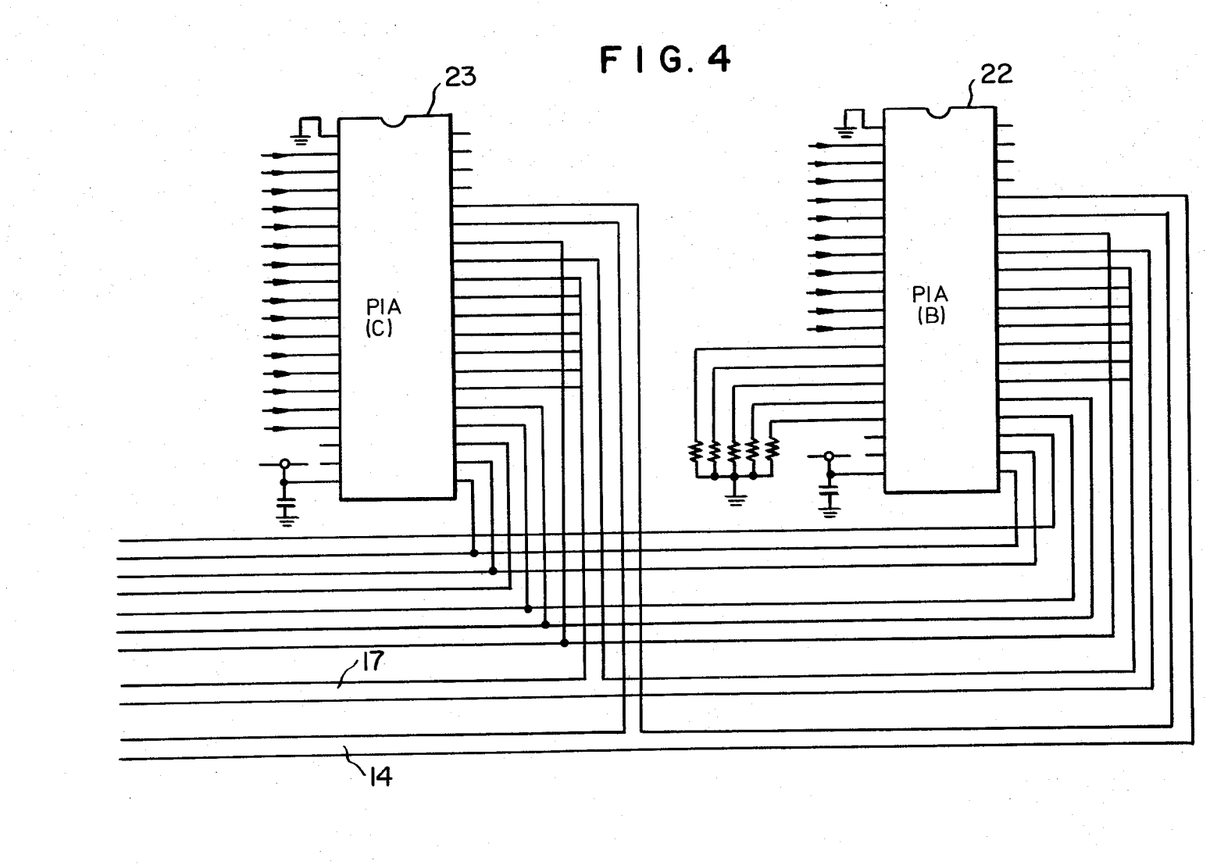
Figure 5:
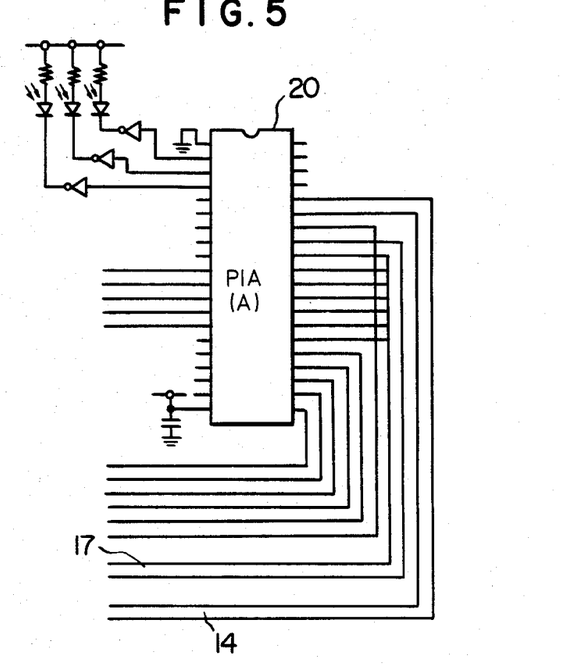
Figure 6:
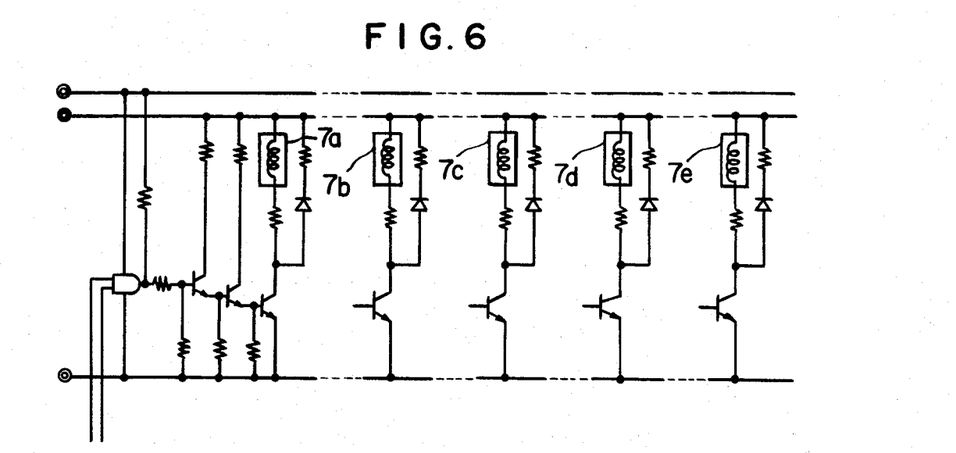
FIG. 6 is an electric wiring diagram for a driving circuit.

A series of rate pulse signals at "b" are sent to drive circuit 5 as shown in FIGS. 1 and 6 through PIA(A) 20 shown in FIGS. 1 and 5. Electric current flows in coils 7a, 7b, 7c, 7d, 7e of a stepping motor 7 (FIGS. 1 and 8) to drive load 6. The position of the load 6 is detected by encoder 21 and fed back to MPU 13 as reference signals input at "c" through PIA(B) 22 of the computer 4 as shown in FIGS. 1 and 4.

The position and the rate of the standard device 2 is detected by encoder 1 and the rate detecting device 9 respectively and are inputted to MPU 13 as reference signals "a" and "e" through PIA(C) 23 of the computer 4.

Figure 3:
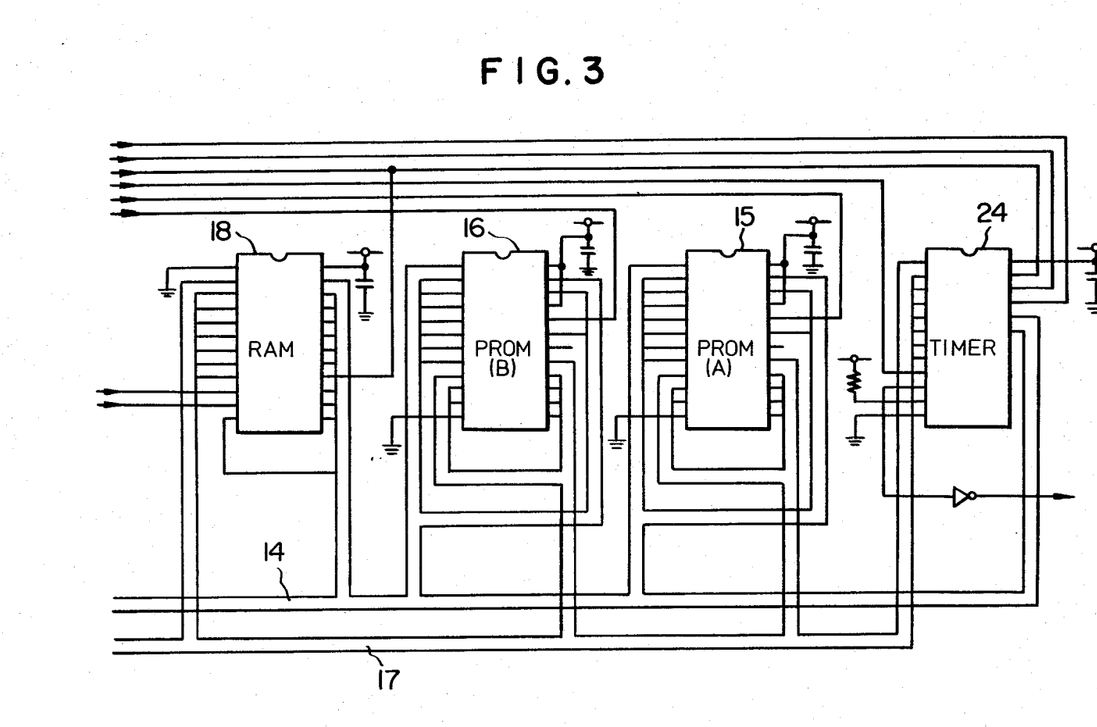

Meanwhile, by means of encoders 1 and 21 and rate detecting device 9, the timer 24 shown in FIGS. 1 and 3 changes the rate pulse signals at "b" and controls the period of a cycle to obtain the desired rate.

Figure 7A:
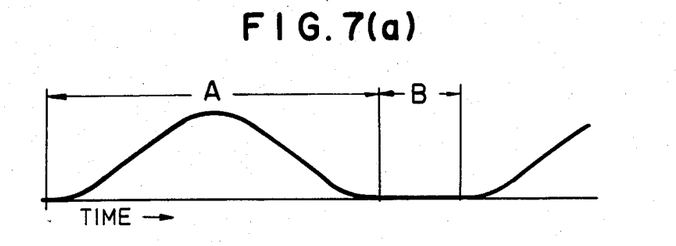
FIG. 7a is a graph of characteristic curves, illustrating the relationship of rate and time in the intermittent drive circuit
Figure 7B:
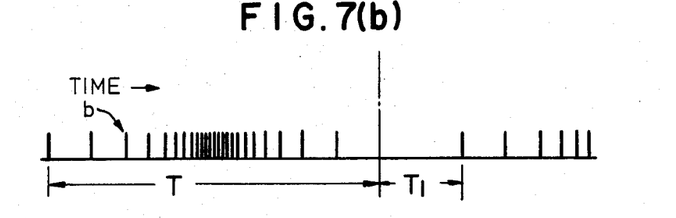
FIG. 7b is a graph, illustrating the relationship of rate pulse signal density and time in the same drive circuit.

Thus the rate pulse signals at "b" are accurately controlled in accordance with the status of the standard device 2 and the load 6 so the load 6 is driven accurately at a rate according to the pulse density as shown in FIG. 7(a).

Two other embodiments according to this invention are shown in FIGS. 8 and 9. A linear type cup filling device is shown in FIG. 8, and a rotary type cup filling device is shown in FIG. 9.

Figure 8A:
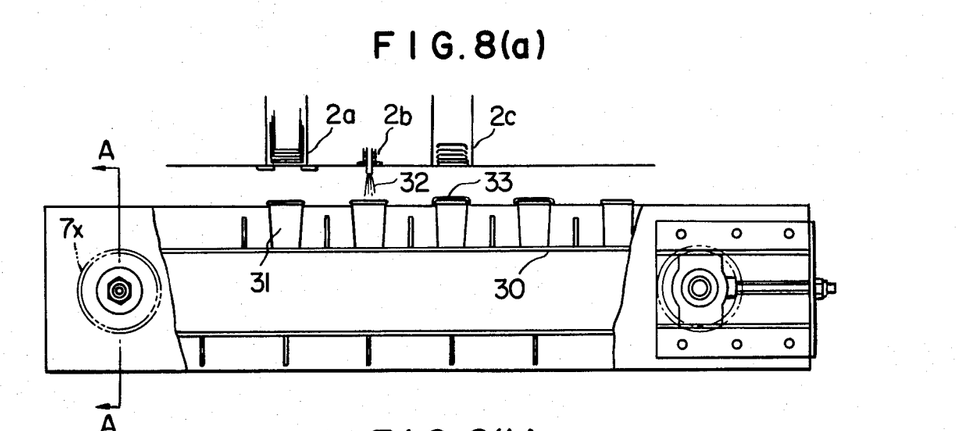
FIG. 8a shows a front view of a filling device.
Figure 8B:
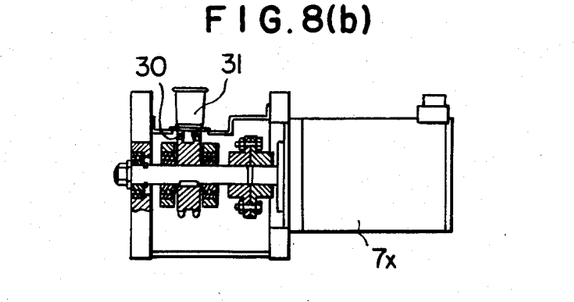

A stepping motor 7x shown in FIG. 8(b) is driven at an intermittent rate illustrated in FIG. 7(a) in response to received rate pulse signals at "b". Thus a conveyer 30 operates in clockwise intermittent steps (rightward) at constant pitch as shown in FIG. 8(a). Cups 31 are supplied to the conveyor 30 one by one at a position just under cup dispenser device 2a, and the cups are filled with liquid 32 at a position just under fluid dispensing and filling device 2b. The cups are then covered with caps at a position just under cap dispensing device 2c. In these operations, the position of the conveyor 30 being driven by stepping motor 7x and the three devices 2a, 2b and 2c are detected by rotary encoders 21 and 1 respectively. The rate of conveyor 30 and the three devices 2a, 2b and 2c are also detected by rate detecting device 9.

Figure 9A:
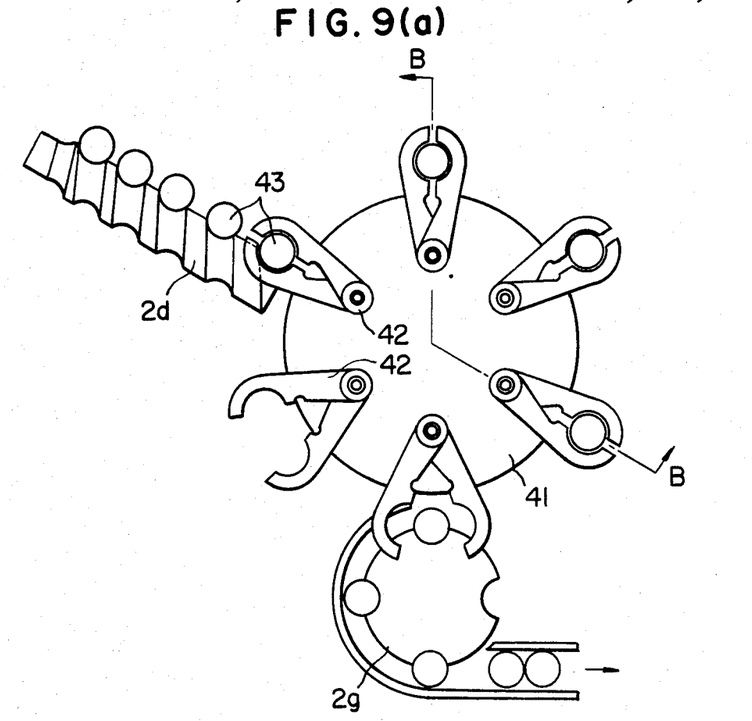
FIG. 9a shows a front view of another type of filling device.
Figure 9B:
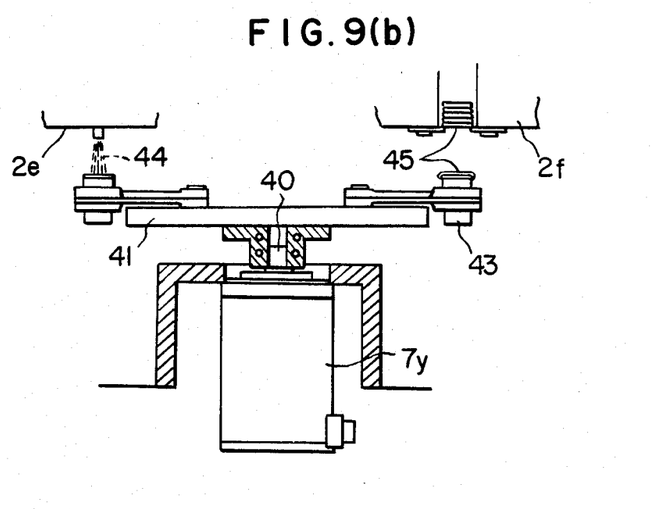

Detected positions and rates are sent to computer 4 as reference signals at inputs a, c and e. Thus stepping motor 7x accurately drives the conveyor 30 in timing and rate by an intermittent pitch synchronized with operation of devices 2a, 2b and 2c. In the rotary device of FIG. 9a, stepping motor 7y (FIG. 9b) is driven at a constant intermittent angle (in this case 60 degrees) so that index table 41 axially attached to end of shaft 40 of the stepping motor 7y is rotated clockwise as shown in FIG. 9(a) in intermittent steps of 60 degrees at the rate shown in FIG. 7(a). Six equally spaced scissors-type holders 42, 42, . . . mounted on the indexed table 41, support cups 43 supplied successively from a timed spiral device 2d. The cups 43 are filled with liquid at the position 44 just under dispensing or filling device 2e as shown in FIG. 9(b), and the cups are sealed in aluminum foil by a sealing device (not shown in figure) at the next station. The cups are covered with caps at the position 45 just under a cap-supplying device 2f as shown in FIG. 9(b), and the filled cups are carried away by turret device 2g. The position and the rate of the index table 41 driven by stepping motor 7y and the three devices 2d, 2e and 2f are detected by rotary encoders 21 and 1 and rate detecting device 9 respectively. Detected data is sent to the computer 4 as reference signals at inputs "a", "c" and "e". Accordingly, the stepping motor 7y accurately drives the index table 41 at a constant intermittent angle in timing and rate, synchronized with operation of the other standard devices 2d, 2e and 2f.

Figure 10A:
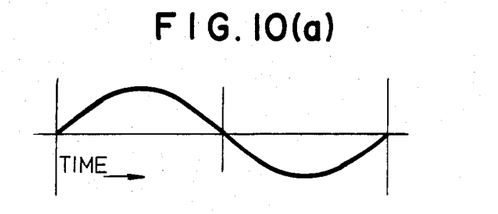
FIGS. 10a, b and c show three types of accelerating curves for an intermittent drive.
Figure 10B:
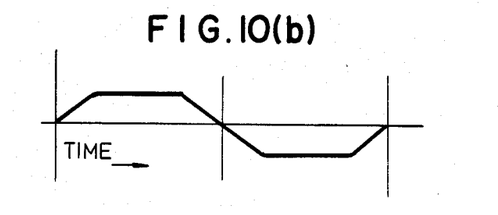
Figure 10C:
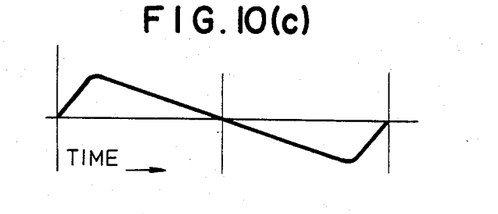

A DC-motor can be employed if desired instead of stepping motor 7y. The acceleration curve of an intermittent drive can be set not only to follow a curve as shown in FIG. 10(a), which corresponds to the rate curve shown in FIG. 7(a), but to a trapezoid or a triangular curve as shown in FIG. 10(b) and (c) respectively.

Figure 11A:
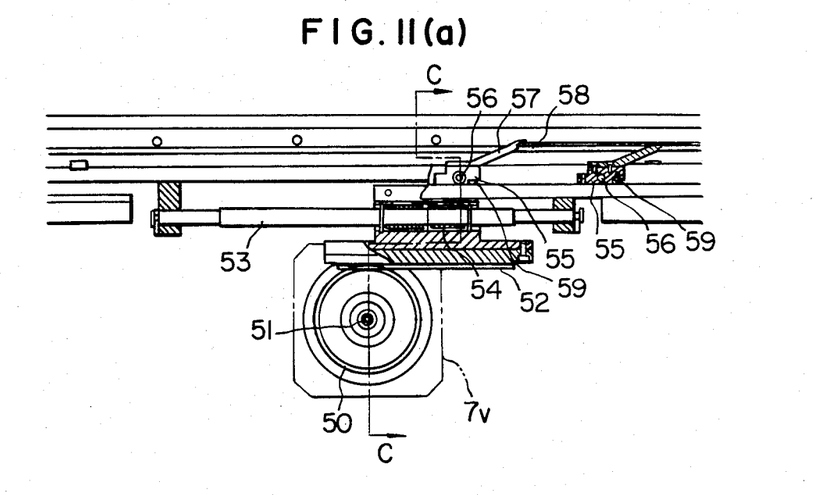
FIG. 11a shows another embodiment of this invention.
Figure 11B:
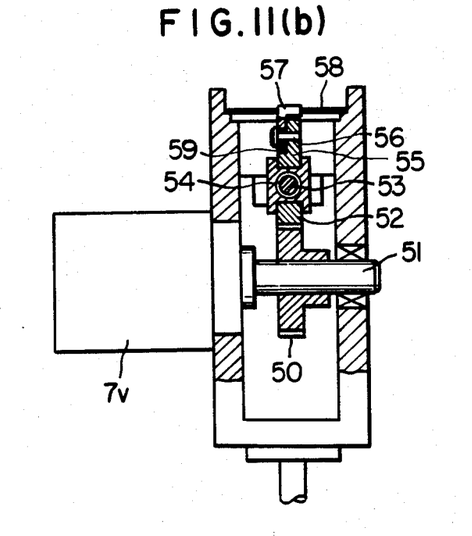

In the alternate embodiment shown in FIG. 11(a) and (b), reciprocal stepping motor 7v is driven by the rate pulse signals at "b". A pinion gear 50 attached to shaft 51 meshes with rack 52 reciprocal supported on a stationary bar 53 by slide bearing 54. Supports 55, 55 . . . on the upper face of the rack 52 are pivotally mounted on shafts 56, 56 . . . in equally spaced relation. The supports 55, 55 . . . have fingers 57, 57 . . . for pushing blank 58. Springs 59, 59 . . . positioned between the rack 52 and supports 55, 55 . . . respectively, bias the fingers 57, 57 . . . upward.

Figure 12:
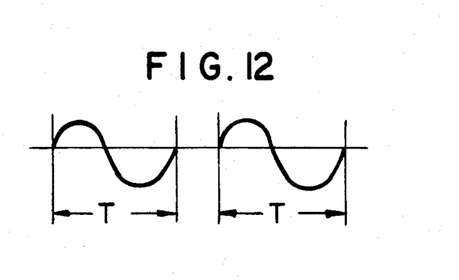
FIG. 12 is a graph of a stroke of the step motor in FIG. 11.

In this embodiment, the stepping motor 7v reciprocal rotates according to the stroke illustrated in FIG. 12 with finger 57 pushing the rear end of a blank 58 to the right as shown in FIG. 11. When the stepping motor 7v reverses its direction, fingers 57, 57 . . . move to the left as shown in FIG. 11 until an abutting finger comes to the end of the blank 58. As soon as the finger 57 passes beyond the end of the blank 58, it is biased upwardly to engage the rear end of the blank 58. Thus a finger 57 will push the blank 58 by a stroke according to the next period T.

In this embodiment, a mechanical linkage is not necessary for another co-operating device. The stroke can be varied by replacing (exchanging) the memory without changing a link, etc.

Figure 13A:
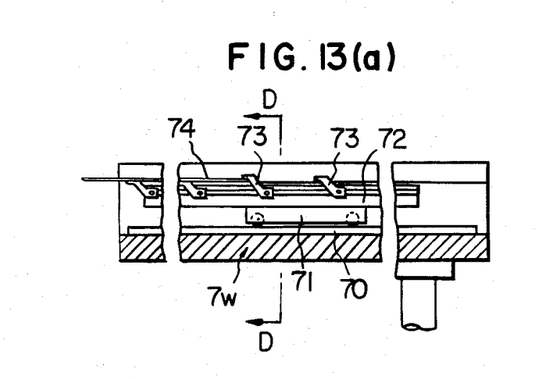
FIG. 13a shows another embodiment of this invention.
Figure 13B:
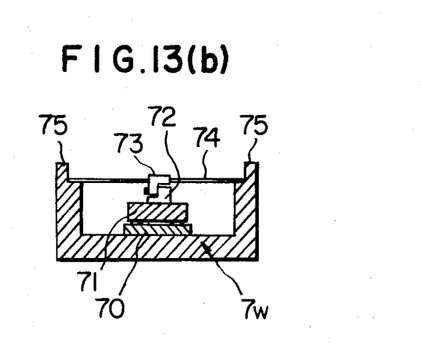

In the embodiment shown in FIG. 13(a) and (b), a linear motor 7w is driven by the rate pulse signals at "b". The motor 7w has a stater 70 (i.e., fixed scale), and a slider 71. A carrier bar 72 is attached to the upper face of the slider 71. Fingers 73, 73 . . . are supported rotatably and resiliently on carrier bar 72 in equally spaced relation, with one finger 73 engaging the rear end of a sheet 74 such as metal plate to be fed to a press or paper to be fed to a printing machine. 75,75 are guides of sheet 74.

The operation of this embodiment is the same as that of the device of FIG. 11. In this embodiment, the construction is simple because gearing, such as pinions or racks are eliminated, which can produce a loss of driving energy and backlash.

Figure 13C:
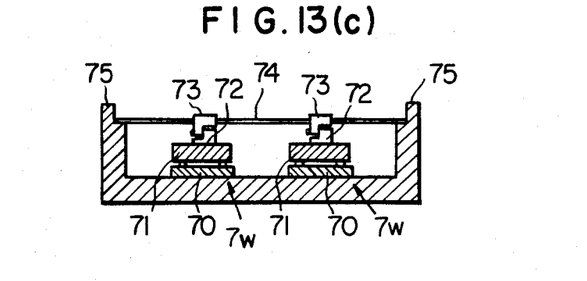
FIG. 13c is a cross-sectional view of another embodiment of this invention

In the case of wider sheet 74, Fingers 73,73 are provided in two rows as shown in FIG. 13c.

As described above, this invention permits the load driving motor to be controlled by a series of rate pulse signals. Therefore it is possible to economically and rapidly provide an intermittent drive system in which a variety of devices can be intermittently driven without complicated mechanisms, such as links and cams.

Moreover, the system can be easily adjusted to changes in timing, rate or period of the driving cycle by simply exchanging a P-ROM element having a program written for generating a series of rate pulse signals.

In a conventional mechanical indexing device, an input axis continuously rotates, while an output axis intermittently rotates. Index angle, one pitch angle, number of stations and accelerating curve are characteristic factors of the device. It is very difficult to change these pre-determined factors without exchanging index devices and other attached members.

In contrast, the intermittent driving system according to this invention has flexibility for changes and is free of the above mentioned inconveniences. Index angle, one pitch angle, number of stations and the accelerating curve, can be easily changed by only exchanging one element, in this case the P-ROM(B)16, so long as they are within the driving torque range.

This invention is not to be limited by the embodiments shown in the drawings and described in the description, which are given by way of example and not of limitation, but only in accordance with the scope of the appended claims.

I claim:

1. A drive control synchronizing system for synchronizing the control of conveyor systems and dispensing systems;
    standard position reference means providing a standard position reference;
    encoding means detecting and encoding an output from said standard reference means;
    rate detecting means receiving an output from said encoding means for detecting the rate of operation of said standard reference means;
    digital processing means receiving inputs from said encoding means and said rate detection means;
    at least one mechanical load means;
    motor means for driving said mechanical load means;
    said digital processing means generating rate pulse signals to directly control operation of said motor means whereby operation of said mechanical load means is synchronized with operation of said standard reference means.

2. The system according to claim 1 in which said motor means includes;
    a motor;
    a motor drive circuit adapted to receive series of output pulses from said computer and drive said motor.

3. The system according to claim 2 in which said motor is a stepping motor.

4. The system according to claim 2 in which said motor is a variable rate controlled DC-motor.

5. The system according to claim 1 in which said standard position reference means is one of a plurality of dispensing means in said conveyor system.

6. The system according to claim 2 in which said mechanical load means is a system for conveying containers past one or more stations; and
    said standard reference means is a dispensing means from one or more dispensing stations;
    said digital processing means processing the inputs from said encoder and rate detecting means to produce an output to directly control the operation of said mechanical load means in synchronization with the operation of said standard position reference means.

* * * * *